United States Patent [19]

Devon et al.

[11] Patent Number: 5,684,871
[45] Date of Patent: Nov. 4, 1997

[54] METHOD AND APPARATUS FOR MULTI-MODE INFRARED DATA TRANSMISSION

[75] Inventors: Mark Daryl Devon; James Lewis Konsevich, both of San Jose, Calif.

[73] Assignee: Apple Computer, Inc., Cupertino, Calif.

[21] Appl. No.: 433,709

[22] Filed: May 2, 1995

[51] Int. Cl.$^6$ .................................................. H03K 7/04
[52] U.S. Cl. ...................... 375/239; 370/213; 332/112
[58] Field of Search ................................. 375/239, 213; 370/213; 332/112, 109

[56] References Cited

U.S. PATENT DOCUMENTS

| | | | |
|---|---|---|---|
| 3,767,855 | 10/1973 | Ueno et al. | 375/239 |
| 4,584,720 | 4/1986 | Garrett | 455/608 |
| 5,257,288 | 10/1993 | Moser | 375/239 |
| 5,314,450 | 5/1994 | Thompson | 607/32 |
| 5,408,351 | 4/1995 | Huang | 359/186 |
| 5,475,381 | 12/1995 | Williamson et al. | 340/825.57 |

*Primary Examiner*—Stephen Chin
*Assistant Examiner*—Kevin Kim
*Attorney, Agent, or Firm*—Blakely, Sokoloff, Taylor & Zafman

[57] ABSTRACT

A method and apparatus for transmitting information over a wireless connection are provided. A correlation is established between a set of symbols and a set of pulse position/signal characteristic combinations. Thus, each symbol has a corresponding pulse position and a corresponding signal characteristic. The signal characteristic may be, for example, a particular frequency, amplitude or phase. To communicate a symbol, a device generates a signal in which a tone burst is sent during the pulse position that corresponds to the symbol. In addition, at least some portion of the signal reflects the signal characteristic that corresponds to the symbol. A receiving device determines the pulse position in which the tone burst was sent and determines the signal characteristic reflected in the signal. The receiving device then determines the symbol based on the pulse position and the signal characteristic. Synchronization is improved by generating synchronization tone bursts before each pulse position modulation frame. Inter-symbol interference is minimized by placing guard bands on each side of the synchronization pulse and/or between pulse windows in each pulse position modulation frame.

35 Claims, 7 Drawing Sheets

Prior Art

METHOD AND APPARATUS FOR MULTI-MODE INFRARED DATA TRANSMISSION

FIELD OF THE INVENTION

The present invention relates to infrared data communications, and more specifically, to a method and apparatus for transmitting data between devices using infrared light.

BACKGROUND OF THE INVENTION

A local area network (LAN) typically consists of a number of stations, computers and peripherals that are connected together via a cabled network in order to exchange data. The recent popularity of portable computers and their associated peripherals, such as printers, telephone modems, and scanners, has created the need for ad hoc data networking in which connections to a network can be made and broken in a relatively easy fashion.

In the past, for a portable computer to send information to the devices on a network, a user had to manually connect the portable computer to the physical cables that carried the network's signals. Before moving the portable computer to another location, the user had to first manually disconnect the portable computer from the network's cables. The need to manually connect and disconnect portable computers in this manner tended to make the portable computers less mobile and convenient.

Consequently, wireless technologies have been developed to eliminate the need for manual connections. For example, wireless technologies have been developed which transmit data via radio frequency (RF) signals, infra-red signals, ultrasonic signals and near field signals. Through the use of wireless technologies, portable computers can easily "connect" into a network simply by being placed in proximity to a device that supports the wireless communication and that is already part of the network.

Each type of wireless technology has its own set of characteristics. For example, ultrasound networks tend to have very low data rates. In contrast, radio frequency (RF) networks provide relatively high data rates (10s of Megabits per second) over relatively long distances (hundreds of feet). RF networks have the disadvantage that RF technology tends to be the most expensive wireless technology. In addition, RF networks are subject to government regulations which vary substantially from one country to the next.

Infrared (IR) connections typically fall into one of two categories. The first category of IR connection is a low cost, short range (a few feet), line-of-sight connection between two IR capable devices. The second category of IR connection is a higher cost, longer range (30-40 feet), diffuse, omnidirectional connection between IR capable devices. Infra-red systems have advantages over RF systems in that data transmitted over IR signals is relatively secure, and IR is generally cheaper than wireless radio links.

Using IR technology, a point-to-point connection between two devices may be constructed for very low cost, with one or two emitter LEDs. If more range is desired, infrared emitters may be added to increase signal strength, at the expense of increased power requirements and cost. Diffuse systems, which have the largest expanse of range, may require up to 10 emitters to fully cover a room.

Numerous modulation methods have been developed for transmitting data using infrared signals. Modulation methods that are currently in commercial use include baseband pulsing, frequency shift keying (FSK), amplitude shift keying (ASK), phase shift keying (PSK), pulse position modulation (PPM) and burst-PPM. Each of these modulation methods involves tradeoffs between cost, signal distance, signal rate and ambient immunity. Ambient immunity, as the term is used herein, is the ability to receive information sent over infrared signals while rejecting ambient sources of light. Ambient sources of light include, for example, sunlight, fluorescent lighting and incandescent lighting.

Baseband pulsing is typically less expensive than the other popular methods, but provides less ambient immunity and distance. Receivers for baseband pulsing can be as simple as a photodiode amplifier and a comparator.

ASK, FSK and PSK systems, on the other hand, typically cost more than baseband pulsing systems. The receivers of these types of systems generally require hardware that is more complex than the hardware required by baseband pulsing systems. Specifically, ASK typically requires a tank circuit and peak detector. FSK typically requires a quadrature frequency discriminator. PSK typically requires PLL based receivers. While ASK, FSK and PSK systems are more expensive than baseband pulsing systems, these systems also tend to have superior ambient immunity.

PPM is used in longer distance diffuse systems, where it is desired to project the maximum light output at the expense of a more complicated transmitter and receiver. For the reception of rectangular pulses, PPM may use a phase locked gated integrator to maximize the signal to noise ratio at the receiver. PPM also has inherent signal to noise advantages over constant carrier schemes. Like baseband systems, conventional PPM systems show poor ambient rejection at low data rates. The ambient rejection improves as the data rate increases to a rate much higher than the ambient. This result occurs because filters may be used to block low frequency interference with relatively minor amplitude and phase distortion of the received signal.

As stated above, pulsed systems which have a low duty cycle and a high value of pulsed current through the transmission LEDs have a signal to noise advantage over constant carrier systems. A large amount of bandwidth is available in pulsed systems because such systems assume that the infrared electronic bandwidth does not need to be shared. Therefore, the signal can be sent over a relatively wide bandwidth. Bandwidth is essentially traded for increased signal power observed at the receiver.

Based on the foregoing, it is clearly desirable to provide a method and system that combines the signal to noise advantage of pulsed infrared systems with a high data rate and high ambient immunity.

SUMMARY OF THE INVENTION

According to one aspect of the invention, a scheme is provided for encoding symbols based on the combination of one or more signal characteristics (e.g. frequency, amplitude and/or phase) and a position of a tone burst in a pulse position modulation frame. Initially, a correspondence between a plurality of signals and a plurality of symbols is established. Each signal reflects a unique pulse position/signal characteristic combination. For the purposes of explanation, it shall be assumed that frequency is the signal characteristic that is combined with pulse position to encode the symbols.

According to one embodiment, a first device communicates a symbol to a second device over a wireless connection by determining the signal that corresponds to the symbol. The first device generates the signal over the wireless connection. The second device receives the signal and determines the unique pulse position/frequency combination from the signal. The second device then determines the symbol based upon the unique pulse position/frequency combination of the signal.

Many variations of this novel encoding scheme are provided. For example, the frequency parameter of the unique pulse position/frequency combination may be the frequency of the tone burst that is sent at the specified pulse position in the pulse position modulation frame, the frequency of a synchronization tone burst sent prior to the pulse position modulation frame, or both. Further, infrared light, radio frequency signals, or some other wireless communication technology may be used to transmit the signal from the first device to the second device.

According to another aspect of the invention, the modulation scheme provides a synchronization tone burst that is sent prior to each pulse position modulation frame. The second device determines the pulse position of the tone burst that follows the synchronization tone burst based on the timing of the synchronization tone burst.

According to yet another aspect of the invention, the modulation scheme includes guard bands in which no signal is transmitted. Preferably, a guard band precedes and follows each synchronization tone burst. This prevents the synchronization tone burst from encroaching into the last pulse window of a preceding pulse position modulation frame or the first pulse window of a subsequent pulse position modulation frame. The pulse position modulation frames may also have guard bands between each pulse window.

According to another aspect of the invention, a receiving device for decoding a signal transmitted over a wireless connection is provided. The receiving device includes a signal detection unit, a pulse position determination unit, a frequency determination unit and a correlation circuit.

The signal detection unit detects the signal on the wireless connection. Signal detection unit may include, for example, an infrared detector. The pulse position determination unit determines the pulse position of the tone burst in the signal. The frequency determination unit determines a frequency reflected by at least a portion of the signal. The correlation circuit determines a symbol that corresponds to the signal based on the pulse position and the frequency.

According to one embodiment, the frequency determination unit includes a plurality of the analog multipliers. Each of analog multipliers is coupled to receive the signal and to receive one of a plurality of reference signals. Each of the plurality of reference signals corresponds to a particular frequency. The plurality of analog multipliers multiply the signal by the plurality of reference signals to produce a plurality of correlation signals. The frequency determination circuit also includes a plurality of integration units coupled to the plurality of analog multipliers. The plurality of integration units receive and integrate the plurality of correlation signals to produce a plurality of integrated signals. The frequency determination unit determines the frequency of the portion of the signal based on the plurality of integrated signals.

According to an alternate embodiment, the frequency determination unit includes a sampling circuit coupled to the signal detection unit. The signal sampling circuit generates a sequence of bits based on the signal. The frequency determination unit further includes a shift register coupled to the sampling circuit and a plurality of reference registers. The sequence of bits are shifted through the shift register. Each reference register contains a reference sequence of bits.

Each reference sequence of bits corresponds to a particular frequency. A comparing unit is coupled to the shift register and to the plurality of reference registers. The comparing unit performs comparisons between the sequence of bits in the shift register and each reference sequence of bits. The frequency determination unit determines the frequency of the portion of the signal based on the comparisons performed by the comparing unit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT PULSE POSITION MODULATION

In pulse position modulation (PPM), the time it takes to transmit a single symbol is referred to as a PPM frame. Each PPM frame is divided up into a fixed number of pulse windows. For standard PPM schemes, the number of pulse windows in a PPM frame is $2^N$, where N is the number of bits being encoded in each symbol.

Figure 1:
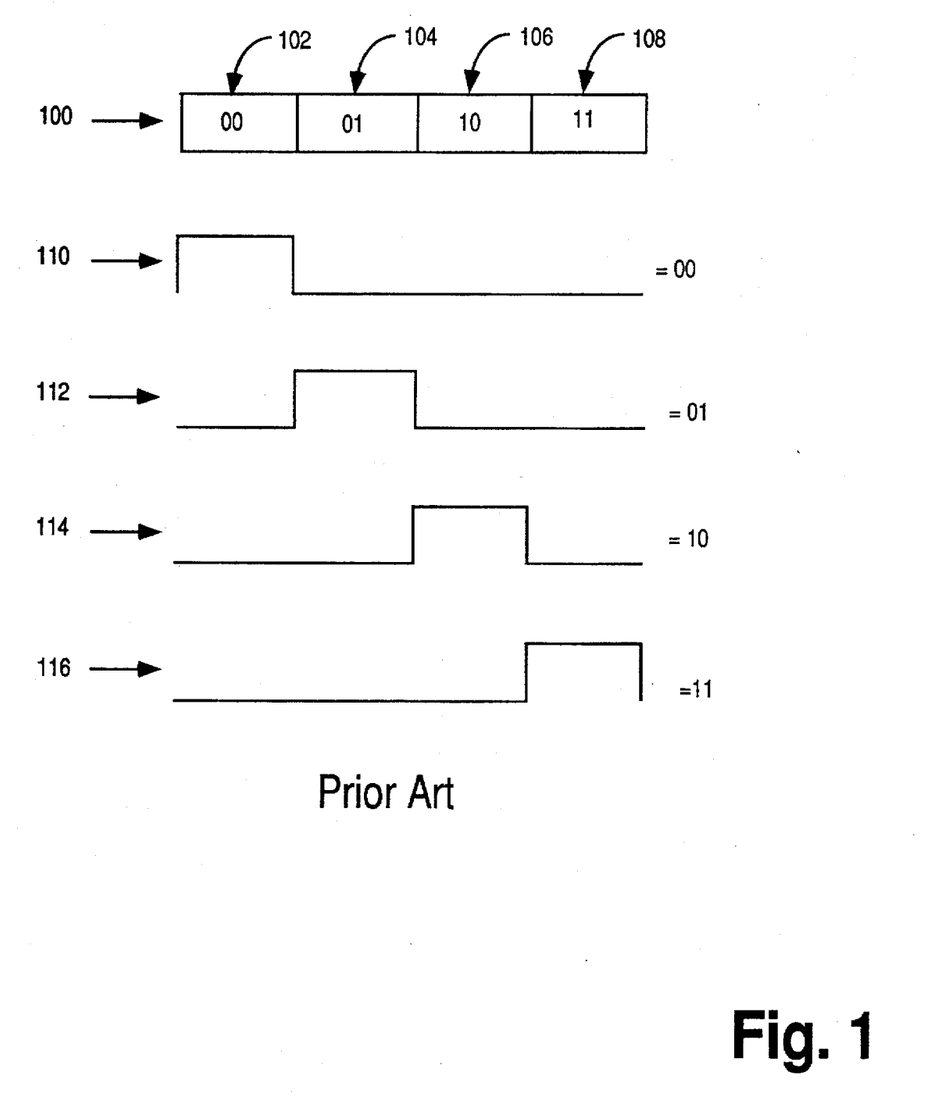
FIG. 1 is a diagram of a typical pulse position modulation scheme.

FIG. 1 illustrates a typical PPM scheme. In the illustrated PPM scheme, each symbol represents two bits of information. Therefore, the PPM frame 100 is divided up into four ($2^2$) pulse windows 102, 104, 106 and 108. Each pulse window is associated with a symbol that represents the value of two bits. In the present example, pulse windows 102, 104, 106 and 108 are associated with '00', '01', '10' and '11' respectively.

In standard PPM, a device communicates a symbol by transmitting a tone burst during the pulse window that corresponds to the symbol. For example, the signal 110, in which a tone burst is sent during pulse window 102, communicates the value '00'. In a similar manner, signals 112, 114 and 116 communicate the values '01', '10' and '11', respectively. A receiving device decodes the PPM signals by measuring the time between each tone burst received and the previous received tone burst. The symbol is then decoded according to the pulse window in which it arrived.

MODIFIED PULSE POSITION MODULATION

In the presently preferred embodiment of the invention, data is sent over wireless connections using a modified pulse position modulation scheme. Specifically, standard pulse position modulation is modified to increase the resulting data rate while maintaining the characteristics of being resistant to low frequency noise in infrared data communication applications. In addition, modifications are made to reduce inter-symbol interference and to promote accurate synchronization.

FREQUENCY SPECTRUM SHIFTING

According to one aspect of the present invention, the standard PPM signal is multiplied by a higher frequency carrier so as to shift its frequency spectrum upward, away from the lower frequency noise generated by fluorescent lights and other sources of disturbance. Consequently, during a given pulse window a tone burst will not be rectangular, but will contain cycles. The number of cycles per tone burst depends on the frequency of the tone burst signal and the length of the pulse windows. At any given frequency, the shorter the pulse windows, the fewer the cycles per pulse window and the higher the data transfer rate. The longer the pulse windows, the greater the number of cycles per pulse window. At any given pulse window duration, the lower the frequency the fewer the cycles per pulse window. The greater the frequency, the higher the number of cycles per pulse window. However, the higher the frequency, the more difficult it is to raise amplifier bandwidth. Further, the frequency cannot exceed that supported by the emitter technology used to implement the invention. Currently, LED emitter technology supports frequencies up to approximately 10 MHz.

SYNCHRONIZATION

Communication may deteriorate if synchronization is lost between a device sending a PPM signal and a device receiving the signal. To ensure synchronization, the present invention transmits a synchronization signal along with the data so that the receiver can re-synchronize for every symbol. Specifically, a tone burst is generated between each PPM frame. The receiver may then decode the incoming signal based on the time that elapses between the synchronization tone burst and the subsequent tone burst. The use of inter-frame tone bursts thus decreases the difficulty of tracking the phase of the low duty cycle received signal. As shall be explained hereafter, the frequency of the synchronization burst can be used as a part of the symbol encoding to produce a very efficient encoding scheme.

GUARD BANDS

Even a relatively relaxed receiver bandwidth can result in inter-symbol interference. Inter-symbol interference refers to the erroneous detection of a tone burst in one pulse window due to the presence of a tone burst in an adjacent pulse window. For example, a portion of the tone burst in the signal 116 of FIG. 1 may carry over into pulse window 102 of the subsequent PPM frame. A receiver may erroneously interpret the tail end of the tone burst to be signal 110.

The present invention addresses the problem of inter-symbol interference by not looking for tone bursts during guard bands. Guard bands are time intervals during which no signal is sent and no signal is looked for. In one embodiment, guard bands are placed immediately before and immediately after the synchronization tone burst. This prevents a tone burst in the last pulse window of a PPM frame from interfering with the synchronization tone burst, and the synchronization tone burst from encroaching into the first pulse window of the PPM frame that follows the synchronization tone pulse.

MULTIPLE FREQUENCY EMBODIMENT

Figure 2:
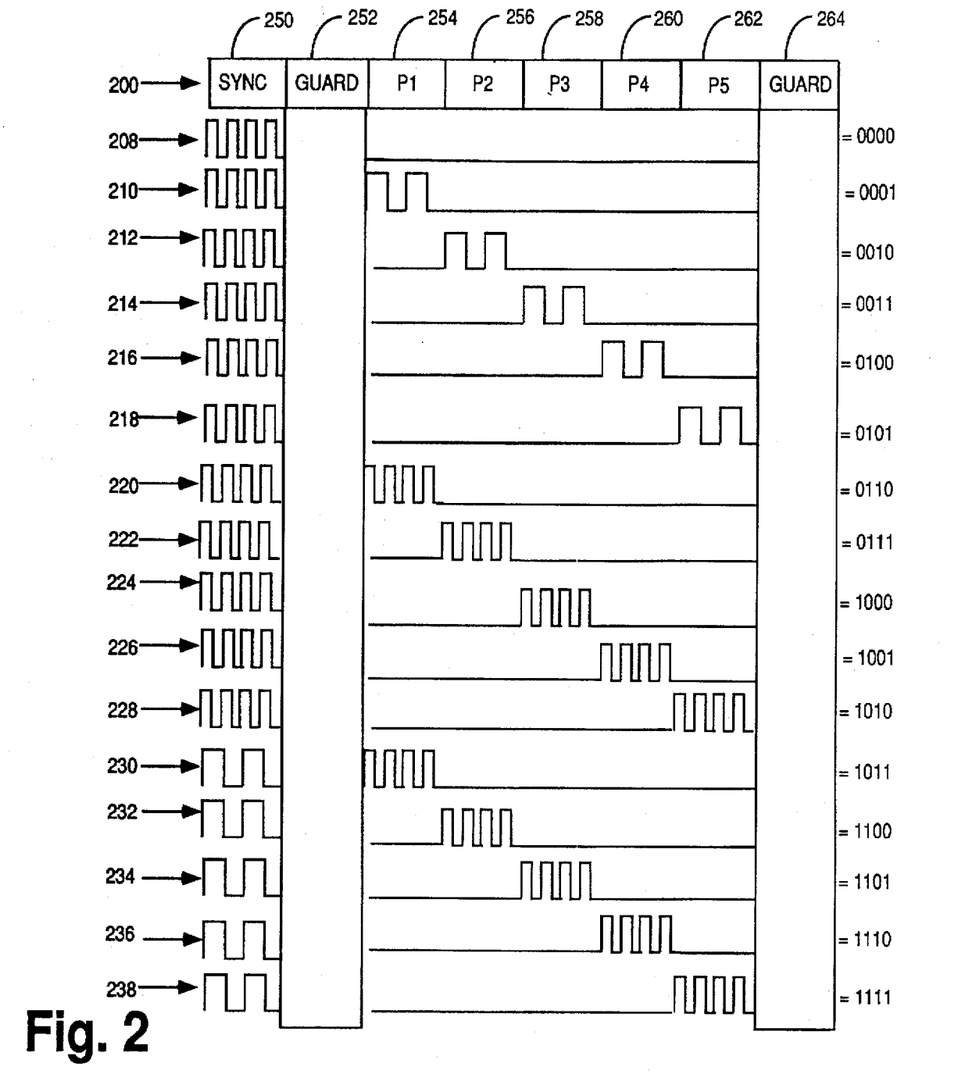
FIG. 2 is a diagram of a modulation scheme that maps frequency/pulse position combinations to symbols according to an embodiment of the invention.

According to one embodiment of the present invention, a transmitter selectively multiplies a standard PPM signal by career signals that have different frequencies. FIG. 2 illustrates the modified PPM signals sent by an infrared transmitter in which two discrete frequencies (e.g. 2 MHz and 4 MHz) are used.

Referring to FIG. 2, it illustrates the alphabet of a modified PPM scheme according to one embodiment of the invention. Element 200 indicates how the time domain is divided up into eight discrete time windows. Five of the time windows are pulse windows 254, 256, 258, 260 and 262 that are analogous to pulse windows found in a standard PPM frame. A first guard band 252 precedes the five pulse windows, and a second guard band 264 follows the five pulse windows. A synchronization window 250 precedes guard band 252.

As explained above, a transmitter transmits a tone burst during synchronization window 250 so that the recipient of the signal will be in phase to accurately decode the symbol sent in the following PPM frame. Guard band 252 prevents the tone burst generated during the synchronization window from encroaching into pulse window 254. Similarly, guard band 264 prevents tone bursts generated during pulse window 262 from encroaching into the subsequent synchronization window.

The tone burst sent during the synchronization window 250 may have any one of the frequencies supported by the transmitter. In the present example, the transmitter supports a 4 MHz tone burst and a 2 MHz tone burst. In signals 208–228, the 4 MHz tone burst is sent during the synchronization window 250. In signals 230–238, the 2 MHz signal is sent during synchronization window 250.

In the multiple-frequency embodiment illustrated in FIG. 2, three keys are used to encode each symbol: the frequency of the synchronization tone burst, the frequency of the signal tone burst, and the pulse position of the signal tone burst. Signals 208–238 illustrate sixteen distinct combinations of these keys and how these combinations can be mapped onto the sixteen possible four-bit binary values. For example, the binary value "0000" is encoded by transmitting a 4 MHz synchronization tone burst followed by a PPM frame in which no signal tone burst is sent. Signal 210 encodes the binary value "0001" by transmitting a 4 MHz synchronization tone burst followed by a 2 MHz signal tone burst that is transmitted during pulse window 254. It should be noted that more than sixteen combinations are possible in a two-frequency 5-pulse window embodiment. However, alphabets which represent an exact power of two are typically used so that all of the symbols translate into the same number of binary digits.

SINGLE FREQUENCY EMBODIMENT

Figure 3:
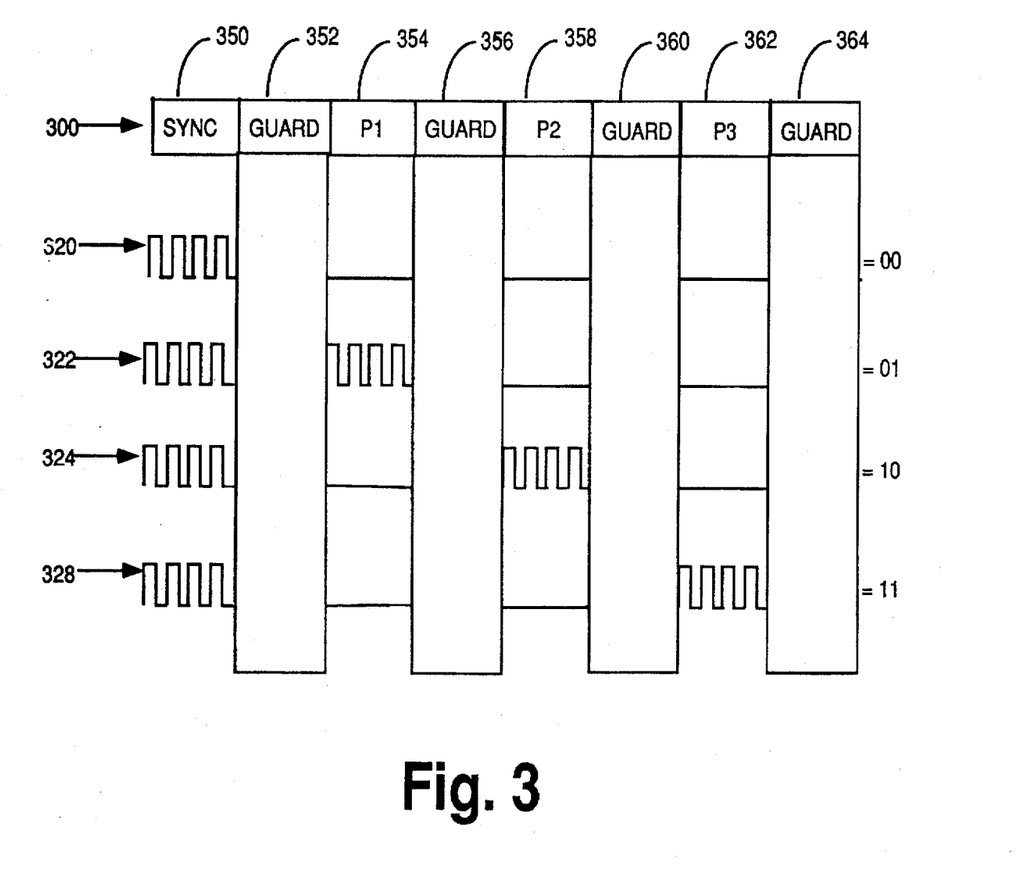
FIG. 3 is a diagram of a modulation scheme which includes guard bands and in which a synchronization tone burst precedes each pulse position modulation frame according to an embodiment of the invention.

In a less complex embodiment, a modified pulse position modulation scheme is used where all tone bursts are multiplied by the same carrier signal. FIG. 3 illustrates a 4-symbol, single frequency alphabet. This embodiment has the advantage of only requiring a single multiplier/integrator stage. In addition, the complexity of the digital correlation logic is reduced.

Referring now to FIG. 3, the time domain 300 is divided up into eight windows. Specifically, the time domain 300 has a synchronization window 350, four guard bands 352, 356, 360, and 364, and three pulse windows 354, 358, and 362. Similar to guard band 252 shown in FIG. 2, guard band 352 prevents the tone burst transmitted during synchronization window 350 from encroaching into pulse window 354. Guard band 364 is similar to guard band 264 of FIG. 2 in that guard band 364 prevents the tone bursts that occur in the last pulse window (e.g., pulse window 362) from encroaching into the synchronization window 350. In addition to these two guard bands 352 and 364, the modulation technique illustrated in FIG. 3 includes guard bands 356 and 360 which prevent tone bursts in one pulse window from encroaching into adjacent pulse windows.

MULTIPLE FREQUENCY RECEIVER

Figure 4:
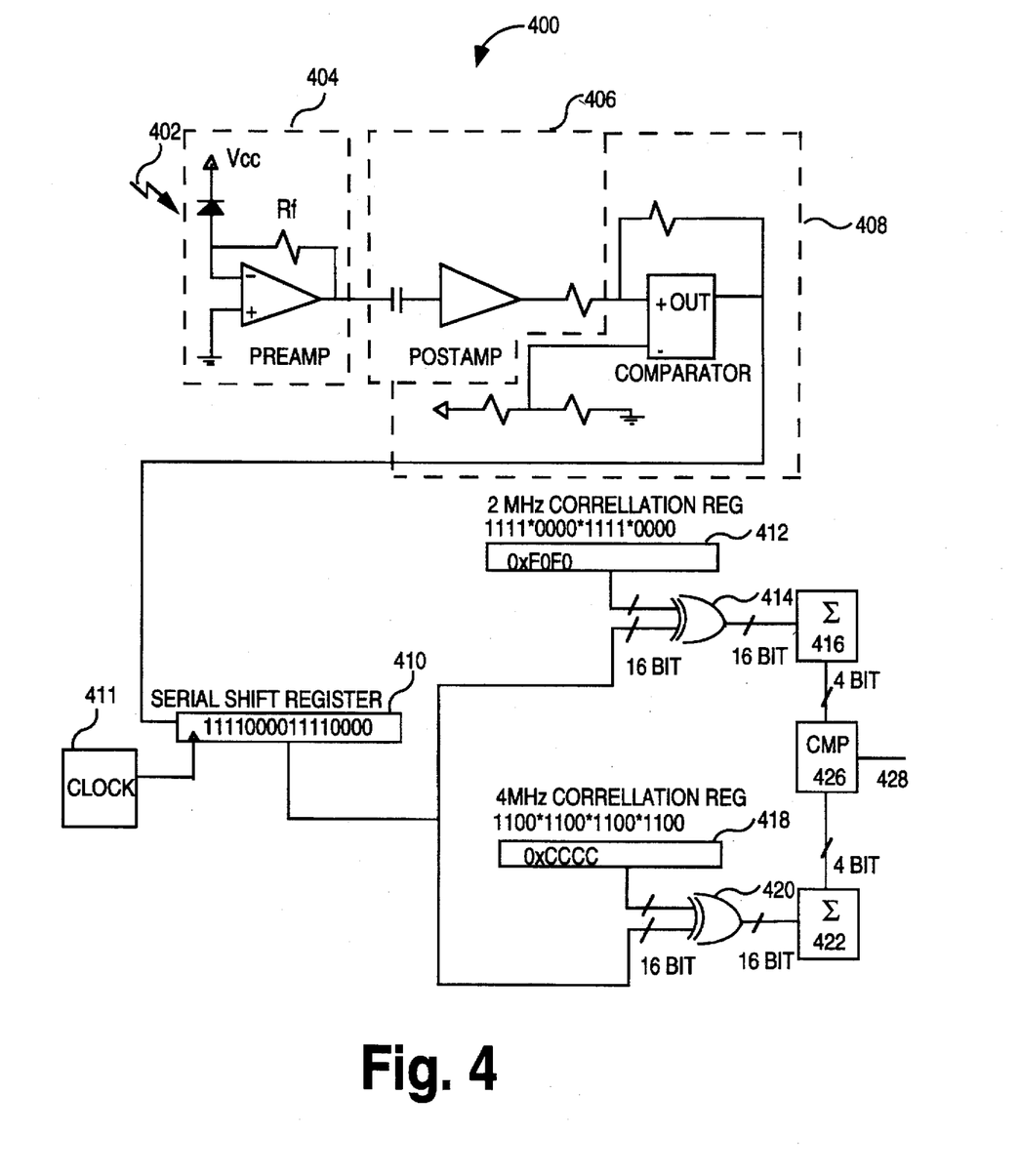
FIG. 4 is a schematic diagram of a frequency determination circuit according to an embodiment of the invention.

As illustrated in FIG. 2, the 2 MHz tone burst has 2 cycles per pulse window, and the 4 MHz tone burst has four cycles per pulse window. To accurately interpret a multiple-frequency signal scheme, such as that illustrated in FIG. 2, a receiver must be able to perform frequency determinations as well as standard PPM decoding. FIG. 4 is a block diagram of a frequency determination circuit for use in an infrared receiver according to one embodiment of the invention.

In circuit 400, correlation is carried out with each clock tick by an exclusive OR function between a 12 bit shift register "image" of the incoming data and the image of each of the individual frequencies 2 and 4 MHz, where the result is contained in a special result register associated with each frequency. Maximum correlation is indicated by the lowest number of "ones" in the result register. Because synchronization information is also being extracted from the correlation, it is necessary to determine if the correlation value has reached a maximum, which can be done by looking for the lowest number seen in the last 36 shifts.

The infrared light signals 402 that carry the frequency/PPM encoded signal are received by a preamplifier 404 operating in the transimpedance mode. The signal is convened into a voltage and amplified by a postamplifier circuit 406, and converted into a digital signal by a comparator circuit 408. The digital output may be correlated via a lookup table in the digital logic and compared to the known modulation frequencies. This process is carried out by shifting the digital output into a shift register 410 which is clocked by a clock circuit 411 at a rate much higher than any of the frequencies used in the modulation. The contents of shift register 410 are compared to values that would be expected upon receipt of a tone burst at each of the known modulation frequencies. Specifically, register 412 contains a string of binary digits that will match the contents of shift register 410 when signal 402 contains a 2 MHz tone burst.

Exclusive OR gate 414 represents a group of bitwise exclusive OR gates, where each bitwise exclusive OR gate compares the state of a bit in register 412 with a bit in serial shift register 410. The output of each of the exclusive OR gates 4 14 goes LOW when the state of the compared bits match. The output signals from each of the bitwise exclusive OR gates 414 are fed to a summation circuit 416 which counts the number of LOW signals generated by exclusive OR gates 414.

Similarly, register 418 contains a string of binary digits that will match the contents of shift register 410 when signal 402 contains a 4 MHz tone burst. Exclusive OR gate 420 represents a second set of bitwise exclusive OR gates. Each bitwise exclusive OR gate 420 compares the state of a bit in shift register 410 with a bit contained in register 418. The output of each of the exclusive OR gates 420 goes LOW when the state of the compared bits match. The output signals from each of the bitwise exclusive OR gates 420 are fed to a summation circuit 422 which counts the number of LOW signals generated by exclusive OR gates 420.

A comparison circuit 426 compares the count from summation circuit 416 with the count from summation circuit 422 to determine whether the input signal resembles a 4 MHz signal or a 2 MHz signal. Comparison circuit 426 generates a signal indicating the detected frequency of the input signal over a line 428. Circuit 400 can easily be expanded to accommodate additional pulse frequencies by the addition of an exclusive OR gate/register circuit for each additional pulse frequency.

Figure 5:
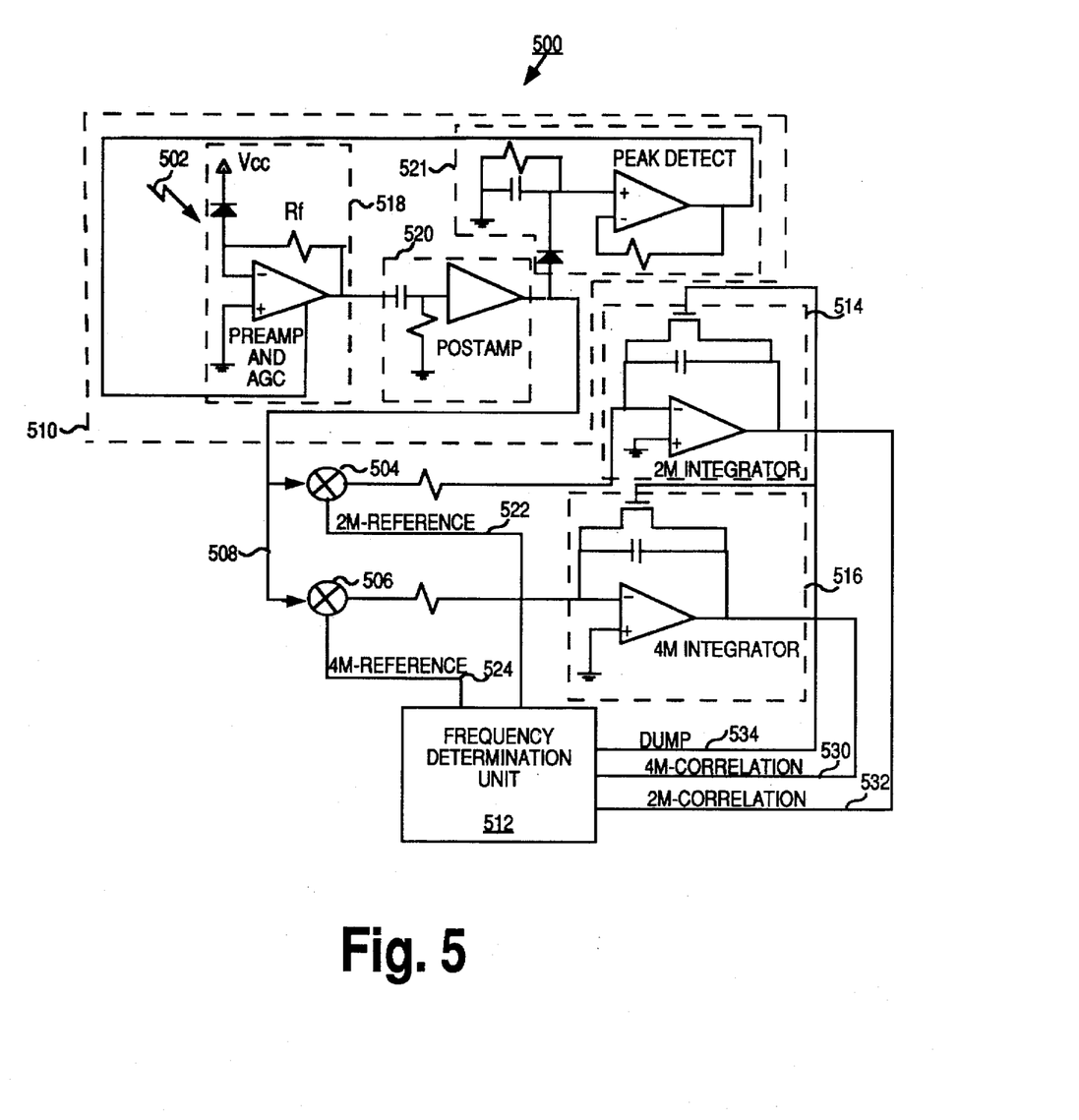
FIG. 5 is a schematic diagram of a frequency determination circuit according to an alternative embodiment of the invention.

FIG. 5 illustrates an alternative decoder 500 for use in an infrared receiver. Decoder 500 correlates the incoming signal 502 to symbols by phase locking to the incoming signal 502 and multiplying the incoming signal 502 by reference signals at the discrete frequencies used followed by integration of the multiplier output.

Phase locking is obtained by a progressive search of each of the phases during a preamble phase. Each of the discrete frequencies is produced with a given initial phase and a correlation is carried out over a 1 microsecond (the burst time) period. All phases are then shifted one master clock period which is at least 6 times the highest frequency, and the correlation is carried out again. At the end of the period, the value is stored by a sample and hold circuit, and the value is compared to that stored from the previous sample.

Figure 6:
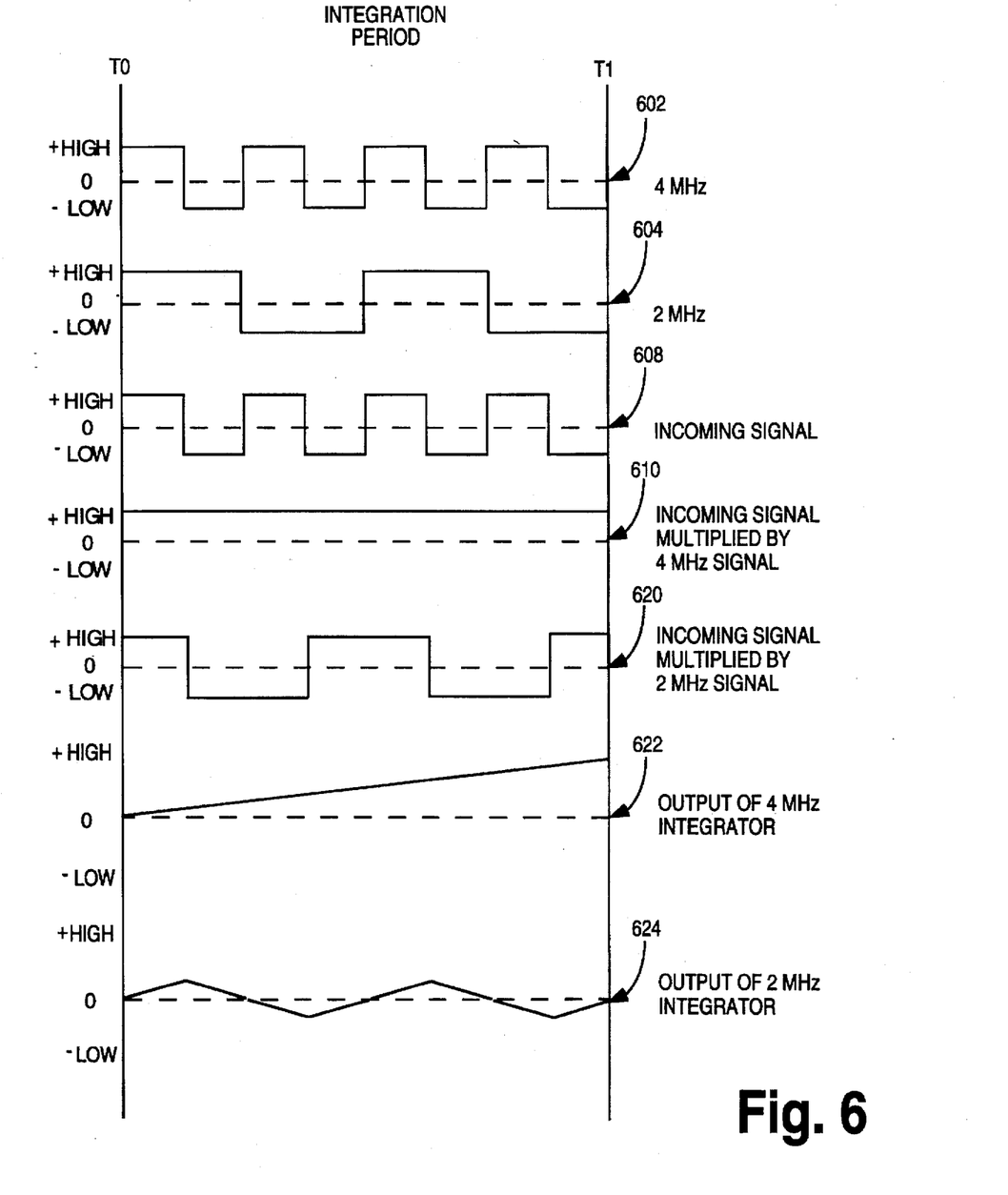
FIG. 6 is a diagram illustrating the value of various signals generated in the frequency determination circuit of FIG. 5.

Referring to FIGS. 5 and 6, the mechanism employed by decoder 500 to determine the frequency of the incoming signal 502 shall now be described. Decoder 500 generally includes a signal conversion unit 510, a group of analog multipliers 504 and 506, a corresponding group of integration units 514 and 516 and a frequency determination unit 512.

Signal conversion unit 510 generally includes a preamplifier circuit 518, a post amplifier circuit 520, and a peak detect circuit 521. Signal conversion unit 510 receives the incoming signal 502 and generates a digital signal over line 508 responsive to the incoming signal 502. For example, if during the period between time T0 and time T1 the incoming signal 502 contains a 4 MHz tone burst, the signal on line 508 will be signal 608 illustrated in FIG. 6.

The group of analog multipliers 504 and 506 includes one for each frequency utilized. In the present example, the incoming signal encodes symbols using either 2 MHz or 4 MHz tone bursts. Each of the analog multipliers 504 and 506 multiplies the signal on line 508 with a reference signal generated by frequency determination unit 512. In the illustrated example, analog multiplier 504 multiples the signal on line 508 by a 2 MHz reference signal generated by frequency determination unit 512 over line 522. Analog multiplier 506 multiplies the signal on line 508 by a 4 MHz reference signal generated by frequency determination unit 512 over line 524. The 4 MHz signal generated by frequency determination unit 512 over line 524 during the period from time T0 to time T1 is illustrated as signal 602 in FIG. 6. The 2 MHz reference signal generated by frequency determination unit 512 over line 522 during the period from time T0 to time T1 is illustrated as signal 604 in FIG. 6.

The result of the multiplication of the signal on line 508 with the 2 MHz reference signal on line 522 is transmitted from multiplier 504 to integration unit 514. In the present example, the signal generated by multiplier 504 and sent to integration unit 514 would be signal 610 illustrated in FIG. 6. This signal 610 stays constantly at the logical high for the period between time T0 and time T1 because the incoming signal 608 identically matches the 4 MHz reference signal 602.

The signal sent from multiplier 504 to integration unit 514 during the period from time T0 to time T1 is shown as signal 620 in FIG. 6. Signal 620 goes high when the incoming signal 608 and the 2 MHz reference signal 604 are either both high or both low. When one of the signals 604 and 608 is high and the other of the signals 604 and 608 is low, signal 620 goes low.

During the period from time T0 to time T1, integrator unit 514 receives and integrates signal 620 and integrator unit 516 receives and integrates signal 610. Since signal 620 oscillates between a logical high and a logical low, signal 624, which represents the output of integration unit 514, also oscillates and has a net result of zero at the integration end. However, the constant logical high of signal 610 which is sent to integration unit 516 causes the voltage at the output of integration unit 516 to constantly increase, as illustrated in signal 622.

At time T1, frequency determination unit 512 senses the outputs of integration unit 514 and integration unit 516 on lines 532 and 530 respectively. The signal on line 530 represents the correlation between the 4 MHz reference signal on line 524 and the incoming signal on line 508 during the period between time T0 and time T1. Similarly, at time T1 the signal on line 532 represents the correlation between the 2 MHz reference signal on line 522 and the incoming signal on line 508 during the period between time T0 and time T1. A magnitude comparison is carried out with the result being that the signal of the largest magnitude is deemed to have the highest correlation to the incoming signal In the present example, the incoming signal on line 508 was a 4 MHz tone burst. Consequently, at time T1, signal 622 on line 530 is greater than that on line 532, indicating that the incoming signal was a 4 MHz tone burst. Signal 624 on line 530 is at a level that indicates no correlation between the 2 MHz reference signal 604 and the incoming signal 608 during the period between time T0 and time T1. Based on the values of the signals at time T1, frequency determination unit 512 determines that the signal 502 that was sent during the time period between time T0 and time T1 was a 4 MHz tone burst. Once this determination has been made, frequency determination unit 512 generates a control signal over line 534 to dump any charge accumulated in either of integration units 514 and 516.

Decoder 500 achieves a modular form in that more discrete frequencies can be added to create "denser" symbols and higher data rates. For each additional frequency added for symbol density, an additional coherent detector must be added.

In the preceding discussion, embodiments of the present invention have been described that encode and decode information based on the position of a tone burst in a PPM frame and the frequency of the tone burst. The synchronization tone bursts and the use of guard bands to prevent inter-symbol interference have also been described. In addition, it has been explained that data may be encoded and decoded based on the frequency of a preceding synchronization tone burst. However, frequency is merely one example of a signal characteristic that may be combined with the pulse position of a tone burst to provide a densely-structured symbol alphabet. Other types of signal characteristics, such as phase and amplitude, may be used instead of or in combination with tone burst frequency to encode data.

Figure 7:
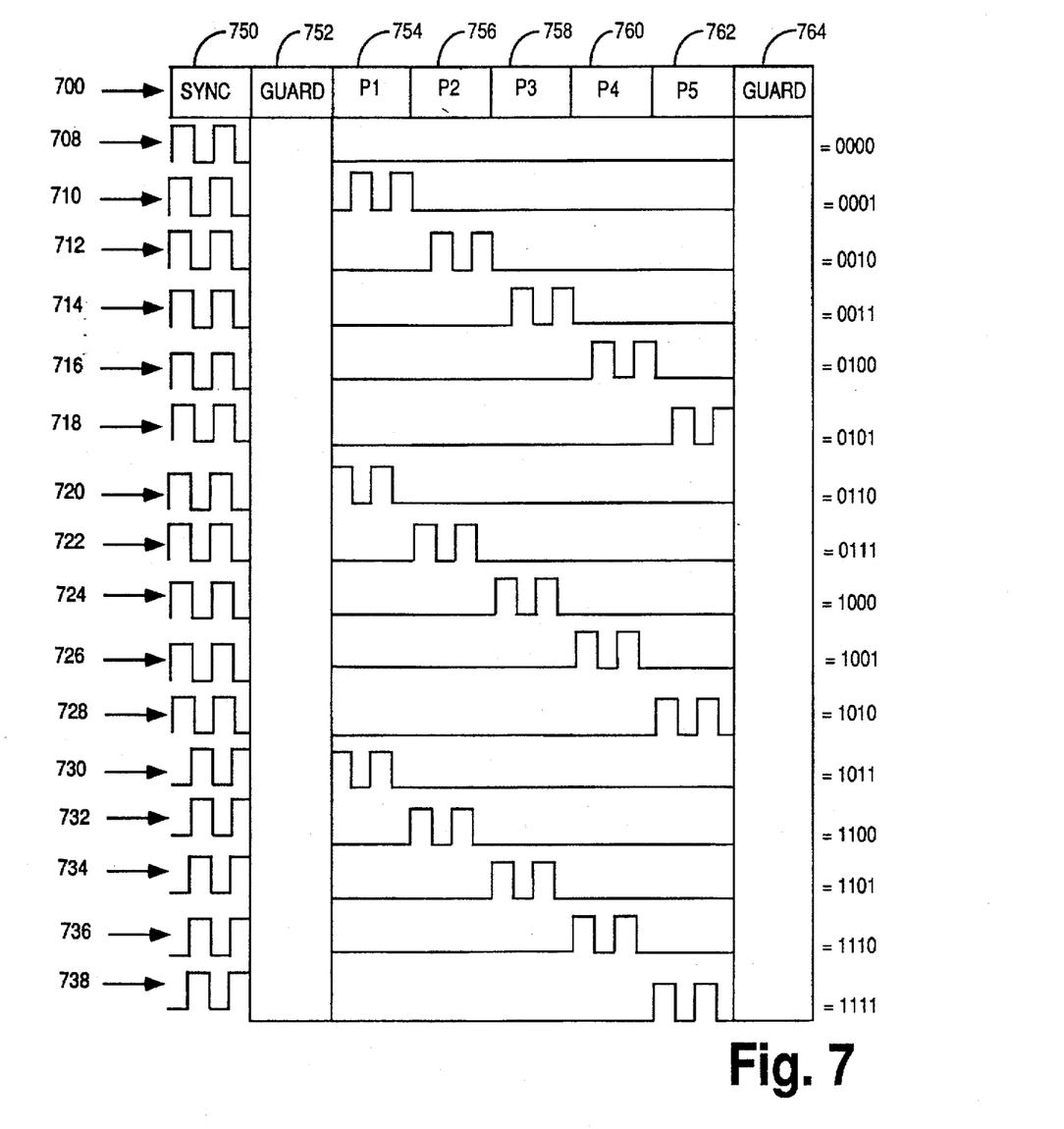
FIG. 7 is a diagram of a modulation scheme that maps phase/pulse position combinations to symbols according to an alternative embodiment of the invention.

Referring to FIG. 7, it illustrates a correlation between sixteen symbols and sixteen pulse position/phase combinations. Specifically, the symbol period 700 includes a synchronization window 750, five pulse windows 754, 756, 758, 760 and 762, and two guard bands 752 and 764. Signals 708 through 738 are mapped to sixteen unique 4-bit values. Signals 710–718 are distinguished from signals 720–728 in that the phase of the signal tone bursts in signals 710–718 is different from the phase of the signal tone bursts in signals 720–728. Signals 730–738 differ from signals 720–728 in that the synchronization tone burst generated during synchronization window 750 for signals 730–738 is at a different phase than the synchronization tone burst transmitted during synchronization window 750 for signals 720–728.

To receive and accurately decode the alphabet illustrated in FIG. 7, a receiver would include a phase determination unit to detect the phase of the tone bursts that are present on the incoming signal. Similarly, an alphabet that maps pulse position/amplitude combinations to symbols would require mechanisms for detecting the amplitude of the tone bursts carried in the incoming signal.

While specific embodiments of the present invention have been described, various modifications and substitutions will become apparent by this disclosure. Such modifications and substitutions are within the scope of the present invention, and are intended to be covered by the following claims.

What is claimed is:

1. A method for communicating a symbol from a first device to a second device over a wireless connection, the method comprising the steps of:

establishing a correspondence between a plurality of signals and a plurality of symbols, wherein each signal of said plurality of signals comprises a pulse within a pulse position modulation frame, said pulse containing cycles oscillating at a pulse frequency, said signal being represented by a unique combination of the position of said pulse within said pulse position modulation frame and said pulse frequency;

causing said first device to
determine a signal of said plurality of signals that corresponds to said symbol, and
generate said signal; and causing said second device to
receive said signal,
determine the unique combination of the position of said pulse within said pulse position modulation frame and said pulse frequency of said signal, and
determine said symbol based upon said unique combination of the position of said pulse within said pulse position modulation frame and said pulse frequency of the signal.

2. The method of claim 1 wherein:
said step of causing said first device to generate said signal includes the
step of causing said first device to
generate a synchronization tone burst prior to said pulse position modulation frame, wherein said synchronization tone burst contains cycles oscillating at a synchronization frequency; and
generate a corresponding tone burst during a particular pulse position of said pulse position modulation frame, said corresponding tone burst comprising said pulse within said pulse position modulation frame.

3. The method of claim 2 wherein said step of causing said second device to determine said symbol further includes the step of causing said second device to determine said symbol based upon a unique combination of the position of said pulse within said pulse position modulation frame, said pulse frequency, and said synchronization frequency.

4. The method of claim 1 wherein:

said step of causing said first device to determine said signal of said plurality of signals that corresponds to said symbol includes the step of causing said first device to determine said pulse frequency that corresponds to said symbol;

said step of causing said first device to generate said signal includes the step of causing said first device to generate at least a portion of said signal at said pulse frequency; and said step causing said second device to determine the unique combination of the position of said pulse within said pulse position modulation frame and said pulse frequency of said signal includes the step of causing said second device to determine said pulse frequency of said portion of said signal.

5. The method of claim 1 wherein:

said step of causing said first device to determine said signal of said plurality of signals that corresponds to said symbol includes the step of causing said first device to determine a phase that corresponds to said symbol;

said step of causing said first device to generate said signal includes the step of causing said first device to generate at least a portion of said signal in said phase; and said step of causing said second device to determine the unique combination of the position of said pulse within said pulse position modulation frame and said pulse frequency of said signal includes the step of causing said second device to determine said phase of said portion of said signal.

6. The method of claim 1 wherein:

said step of causing said first device to generate said signal comprises the step of causing said first device to emit infrared light; and said step of causing said second device to receive said signal comprises the step of causing said second device to detect infrared light.

7. The method of claim 1 wherein:

said step of causing said first device to generate said signal comprises
the steps of causing said first device to
generate a synchronization tone burst prior to said pulse position modulation frame, said synchronization tone burst containing cycles oscillating at a synchronization frequency, and
generate a tone burst during a pulse window of said pulse position modulation frame, wherein said tone burst comprises said pulse within said pulse position modulation frame;

said step of causing said second device to receive said signal includes causing said second device to
receive said synchronization tone burst prior to receiving said tone burst.

8. The method of claim 7 further comprising the steps of:
causing said first device to not send any signal during a first guard band after generating said synchronization tone burst and before said pulse position modulation frame; and
causing said first device to not send any signal during a second guard band after said pulse position modulation frame.

9. The method of claim 7 wherein:

said step of causing said second device to determine said symbol further includes the step of determining said symbol based upon a unique combination of the position of said pulse within said pulse position modulation frame, said pulse frequency, and said synchronization frequency.

10. A method for communicating a symbol from a first device to a second device over a wireless connection, the method comprising the steps of:
causing said first device to
determine a pulse position that corresponds to said symbol, wherein said pulse position is one of a plurality of pulse positions in a pulse position modulation frame;
generate a synchronization tone burst prior to beginning said pulse position modulation frame;
generate a tone burst at a particular frequency during a pulse window that is at said pulse position of said pulse position modulation frame, wherein said particular frequency is sufficiently high to cause said tone burst to cycle more than once during said pulse window;
causing said second device to
receive said synchronization tone burst;
receive said tone burst;
determine said pulse position based upon said synchronization tone burst and said tone burst; and
determine said symbol based upon said pulse position.

11. The method of claim 10 wherein:

said step of causing said first device to generate said tone burst comprises causing said first device to emit infrared light; and said step of causing said second device to receive said tone burst comprises causing said second device to detect infrared light.

12. The method of claim 10 further comprising the steps of:
causing said first device to not generate any signal during a first guard band after generating said synchronization tone burst and before said pulse position modulation frame;
causing said first device to not generate any signal during a second guard band after said pulse position modulation frame; and
causing said first device to send a second synchronization tone burst after said second guard band.

13. A method for communicating a symbol from a first device to a second device over a wireless connection, the method comprising the steps of:
causing said first device to
determine a pulse position that corresponds to said symbol, wherein said pulse position is one of a plurality of pulse positions in a pulse position modulation frame, wherein said pulse position modulation frame includes at least one guard band, wherein said at least one guard band is a time interval during which no tone bursts are sent by said first device;
generate a tone burst at a particular frequency during a pulse window that is at said pulse position of said pulse position modulation frame, wherein said particular frequency is sufficiently high to cause said tone burst to cycle more than once during said pulse window;
causing said second device to
receive said tone burst;
determine said pulse position of said tone burst; and
determine said symbol based upon said pulse position.

14. The method of claim 13 wherein said pulse position modulation frame includes a plurality of guard bands.

15. The method of claim 14 wherein each pulse window in said pulse position modulation frame is followed by one of said plurality of guard bands.

16. The method of claim 14 further comprising the step of causing said first device to generate a synchronization tone burst prior to said pulse position modulation frame, wherein a guard band occurs after generating said synchronization tone burst and before said pulse position modulation frame.

17. A transmitting device for communicating a symbol to a receiving device over a wireless connection, the transmitting device comprising:

a signal selection mechanism configured to select a selected signal from a plurality of signals, wherein the selected signal corresponds to the symbol according to a predetermined correspondence between said plurality of signals and a plurality of symbols, wherein each signal of said plurality of signals comprises a pulse within a pulse position modulation frame, said pulse containing cycles oscillating at a pulse frequency, said signal being represented by a unique combination of the position of said pulse within said pulse position modulation frame and said pulse frequency; and a signal generation mechanism for generating said selected signal over said wireless connection.

18. The transmitting device of claim 17 wherein:

said signal generation mechanism generates a synchronization tone burst prior to said pulse position modulation frame, wherein said synchronization tone burst contains cycles oscillating at a synchronization frequency; and said signal generation mechanism generates a corresponding tone burst during a particular pulse position of said pulse position modulation frame, said corresponding tone burst comprising said pulse within said pulse position modulation frame.

19. The transmitting device of claim 17 wherein:

said signal selection mechanism determines a frequency that corresponds to said symbol; and said signal generation mechanism generates at least a portion of said selected signal at said frequency.

20. The transmitting device of claim 17 wherein:

said signal selection mechanism determines a phase that corresponds to said symbol; and said signal generation mechanism generates at least a portion of said selected signal in said phase.

21. The transmitting device of claim 17 wherein said signal generation mechanism includes an infrared light emitter.

22. The transmitting device of claim 17 wherein:

said signal generation mechanism generates a synchronization tone burst prior to said pulse position modulation frame, and said signal generation mechanism generates a tone burst during a pulse window of said pulse position modulation frame, wherein said tone burst comprises said pulse within said pulse position modulation frame.

23. The transmitting device of claim 22 wherein:

said signal generation mechanism is configured to not send any signal during a first guard band after generating said synchronization tone burst and before said pulse position modulation frame; and said signal generation mechanism is configured to not send any signal during a second guard band after said pulse position modulation frame.

24. The transmitting device of claim 23 wherein:

said signal generation mechanism generates said synchronization tone burst such that said synchronization tone burst contains cycles oscillating at a synchronization frequency; and said signal is represented by a unique combination of the position of said pulse within said pulse position modulation frame, said pulse frequency, and said synchronization frequency.

25. A receiving device for decoding a signal transmitted over a wireless connection, wherein the signal includes a tone burst in a pulse window at a particular pulse position of a pulse position modulation frame, said tone burst comprising cycles of a pulse frequency, the receiving device comprising:

a signal detection unit for detecting the signal on said wireless connection;

a pulse position determination unit for determining said particular pulse position based on said signal;

a signal characteristic determination unit for determining a signal characteristic possessed by at least a portion of said signal, said signal characteristic including said pulse frequency of said cycles comprising said tone burst;

a correlation circuit for determining a symbol that corresponds to said signal based on said particular pulse position and said signal characteristic.

26. The receiving device of claim 25 wherein said signal characteristic determination unit includes a circuit for determining the frequency of said portion of said signal.

27. A receiving device for decoding a signal transmitted over a wireless connection, wherein the signal includes a tone burst in a pulse window at a particular pulse position of a pulse position modulation frame, the receiving device comprising:

a signal detection unit for detecting the signal on said wireless connection;

a pulse position determination unit for determining said particular pulse position based on said signal;

a signal characteristic determination unit for determining a signal characteristic possessed by at least a portion of said signal, wherein said signal characteristic includes the frequency of said portion of said signal;

a correlation circuit for determining a symbol that corresponds to said signal based on said particular pulse position and said signal characteristic;

a plurality of analog multipliers, wherein each of said plurality of analog multipliers is coupled to receive said signal and to receive one of a plurality of reference signals, wherein each of said plurality of reference signals corresponds to a particular frequency, wherein said plurality of analog multipliers multiply said signal by said plurality of reference signals to produce a plurality of correlation signals;

a plurality of integration units coupled to said plurality of analog multipliers, wherein said plurality of integration units receive and integrate said plurality of correlation signals to produce a plurality of integrated signals; and a frequency determination unit coupled to said plurality of integration units, said frequency determination unit determining the frequency of said portion of said signal based on said plurality of integrated signals.

28. The receiving device of claim 27 wherein said circuit includes:

a sampling circuit coupled to said signal detection unit for generating a sequence of bits based on said signal;

a shift register coupled to said sampling circuit, said sequence of bits being shifted through said shift register;

a plurality of reference registers, wherein each reference register contains a reference sequence of bits, wherein each reference sequence of bits corresponds to a particular frequency;

a comparing unit coupled to said shift register and said plurality of reference registers, said comparing unit performing comparisons between said sequence of bits in said shift register and each reference sequence of bits; and a frequency determination unit coupled to said comparing unit, said frequency determination unit determining the frequency of said portion of said signal based on said comparisons performed by said comparing unit.

29. A method for communicating a symbol from a first device to a second device over a wireless connection, the method comprising the steps of:

establishing a correspondence between a plurality of signals and a plurality of symbols, wherein each signal of said plurality of signals comprises a pulse within a pulse window of a pulse position frame, said signal containing a unique combination of the position of said pulse within said pulse position frame, a pulse characteristic, and a synchronization characteristic;

causing said first device to
determine a signal of said plurality of signals that corresponds to said symbol, and
generate said signal; and causing said second device to receive said signal,
determine the unique combination of the position of said pulse within said pulse position frame, said pulse characteristic, and said synchronization characteristic of said signal, and
determine said symbol based upon said unique combination of the signal.

30. The method of claim 29 wherein said step of causing said first device to generate said signal further comprises the step of causing said first device to generate said pulse within said pulse position frame wherein said pulse comprises a tone burst containing said pulse characteristic.

31. The method of claim 30 wherein said step of causing said first device to generate said signal further comprises the step of causing said first device to generate a synchronization tone burst prior to said pulse position frame, said synchronization tone burst containing said synchronization characteristic.

32. The method of claim 31 wherein said step of causing said first device to generate said signal further comprises the step of causing said first device to generate a guard band between said synchronization tone burst and said pulse position frame, said guard band preventing the transmission of any pulses within the period of said guard band.

33. The method of claim 32 wherein said step of causing said first device to generate said signal further comprises the step of causing said first device to generate a guard band between each window of said pulse position frame.

34. The method of claim 30 wherein said tone burst contains cycles oscillating at a pulse frequency, said pulse frequency comprising said pulse characteristic.

35. The method of claim 31 wherein said synchronization tone burst contains cycles oscillating at a synchronization frequency, said synchronization frequency comprising said synchronization characteristic.

* * * * *